US009526092B2

(12) United States Patent
Chen et al.

(10) Patent No.: US 9,526,092 B2
(45) Date of Patent: Dec. 20, 2016

(54) METHOD OF ALLOCATING RESOURCES FOR SCHEDULING REQUEST AND USER EQUIPMENT USING THE SAME AND A CONTROL NODE USING THE SAME

(71) Applicant: Industrial Technology Research Institute, Hsinchu (TW)

(72) Inventors: Hung-Chen Chen, Kaohsiung (TW); Jung-Mao Lin, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 737 days.

(21) Appl. No.: 13/887,378

(22) Filed: May 6, 2013

(65) Prior Publication Data

US 2013/0301446 A1 Nov. 14, 2013

Related U.S. Application Data

(60) Provisional application No. 61/646,889, filed on May 14, 2012.

(51) Int. Cl.
*H04W 72/04* (2009.01)
*H04W 72/12* (2009.01)
(Continued)

(52) U.S. Cl.
CPC ..... *H04W 72/0413* (2013.01); *H04W 72/1284* (2013.01); *H04W 76/00* (2013.01); *H04W 28/06* (2013.01); *H04W 72/04* (2013.01)

(58) Field of Classification Search
None
See application file for complete search history.

(56) References Cited

U.S. PATENT DOCUMENTS 7,653,376 B2   1/2010   Aaltonen et al.
7,680,036 B2   3/2010   Yang et al.
(Continued)

FOREIGN PATENT DOCUMENTS

| CN | 101822111 | 9/2010 |
|---|---|---|
| TW | 201212681 | 3/2012 |
| WO | 2011025426 | 3/2011 |

OTHER PUBLICATIONS

"Efficient SR resource allocation on PUCCH," Ericsson, ST-Ericsson, Tdoc R2-121535, 3GPP TSG-RAN WG2 #77bis, Jeju, South Korea, Mar. 26-30, 2012.
(Continued)

*Primary Examiner* — Ayaz Sheikh
*Assistant Examiner* — Faiyazkhan Ghafoerkhan
(74) *Attorney, Agent, or Firm* — Jianq Chyun IP Office

(57) ABSTRACT

The present disclosure proposes a method of allocating resources for a scheduling request (SR), a user equipment using the same method, and a control node using the same method, which is related to dynamically adjusting a dedicated SR (D-SR) period which is a semi-persistently configured D-SR resource used to transmit a SR. The method, the user equipment, and the control node would perform functions including establishing a connection between the user equipment and the control node in order to transmit uplink data, the user equipment transmitting through the connection an assisting information to the control node after establishing the connection to adjust the D-SR period, and the user equipment obtaining a second D-SR period after transmitting the assisting information to the control node.

42 Claims, 9 Drawing Sheets

(51) Int. Cl.
*H04W 76/00* (2009.01)
*H04W 28/06* (2009.01)

(56) References Cited

U.S. PATENT DOCUMENTS

| | | | |
|---|---|---|---|
| 7,821,993 B2 | 10/2010 | Shin et al. | |
| 7,936,775 B2 | 5/2011 | Iwamura | |
| 8,059,524 B2 | 11/2011 | Bertrand et al. | |
| 8,265,682 B2* | 9/2012 | Bertrand | H04W 52/0225 370/318 |
| 9,144,062 B2* | 9/2015 | Chou | H04W 72/0413 |
| 9,210,617 B2* | 12/2015 | Pan | H04W 28/18 |
| 2008/0039109 A1* | 2/2008 | Cave | H04W 28/16 455/450 |
| 2008/0186997 A1* | 8/2008 | Becker | H04B 7/18582 370/458 |
| 2008/0187002 A1* | 8/2008 | Becker | H04B 7/18582 370/468 |
| 2008/0187003 A1* | 8/2008 | Becker | H04B 7/18582 370/468 |
| 2009/0028065 A1* | 1/2009 | Iwai | H04J 13/0055 370/252 |
| 2009/0109937 A1* | 4/2009 | Cave | H04W 74/0866 370/336 |
| 2009/0197610 A1 | 8/2009 | Chun et al. | |
| 2009/0201868 A1* | 8/2009 | Chun | H04W 72/1278 370/329 |
| 2009/0239568 A1* | 9/2009 | Bertrand | H04W 52/0225 455/522 |
| 2009/0305716 A1* | 12/2009 | Ono | H04W 72/1231 455/452.2 |
| 2009/0323712 A1 | 12/2009 | Bodin et al. | |
| 2010/0035621 A1 | 2/2010 | Chun et al. | |
| 2010/0074193 A1 | 3/2010 | Chaponniere | |
| 2010/0074271 A1 | 3/2010 | Iwamura | |
| 2010/0182992 A1* | 7/2010 | Chun | H04W 56/0005 370/350 |
| 2010/0184445 A1* | 7/2010 | Tseng | H04W 72/1284 455/450 |
| 2010/0202420 A1* | 8/2010 | Jersenius | H04L 47/10 370/337 |
| 2010/0273493 A1 | 10/2010 | Matsunaga et al. | |
| 2010/0298016 A1* | 11/2010 | Madan | H04J 11/0053 455/501 |
| 2011/0002321 A1* | 1/2011 | Iwai | H04J 13/0055 370/342 |
| 2011/0009116 A1* | 1/2011 | Moberg | H04W 36/0088 455/425 |
| 2011/0038345 A1 | 2/2011 | Liu et al. | |
| 2011/0228673 A1 | 9/2011 | Grayson et al. | |
| 2011/0243080 A1* | 10/2011 | Chen | H04W 74/0841 370/329 |
| 2011/0274092 A1 | 11/2011 | Liu et al. | |
| 2012/0039278 A1* | 2/2012 | Park | H04W 72/1278 370/329 |
| 2012/0069805 A1 | 3/2012 | Feuersanger et al. | |
| 2012/0093106 A1* | 4/2012 | Dong | H04W 74/006 370/329 |
| 2012/0122465 A1* | 5/2012 | Landstrom | H04W 72/1252 455/450 |
| 2012/0124196 A1 | 5/2012 | Brisebois et al. | |
| 2012/0238318 A1 | 9/2012 | Sebire et al. | |
| 2012/0263036 A1 | 10/2012 | Barclay et al. | |
| 2012/0281654 A1* | 11/2012 | Aiba | H04L 5/0007 370/329 |
| 2013/0044699 A1* | 2/2013 | Eriksson | H04W 72/1289 370/329 |
| 2013/0250828 A1* | 9/2013 | Chou | H04W 72/0413 370/311 |
| 2013/0301446 A1* | 11/2013 | Chen | H04W 72/0413 370/252 |

OTHER PUBLICATIONS

3GPP TSG-RAN WG2 #77bis Tdoc R2-121535 Jeju, South Korea, 26th, Mar. 30, 2012, pp. 1-5.
"Office Action of Taiwan Counterpart Application", issued on Feb. 26, 2015, p. 1-p. 4.
Research in Motion UK Limited, "SR for eDDA," 3GPP TSG RAN WG2 Meeting 78, May 21-25, 2012, pp. 1-4.
Renesas Mobile Europe, "PUCCH Improvements for Diverse Data Applications," 3GPP TSG RAN WG2 Meeting 77, Feb. 6-10, 2012, pp. 1-2.
Huawei, Hisilicon, "Improving the trade-off between SR delay and uplink resource usage," 3GPP TSG RAN WG2 Meeting 77, Feb. 6-10, 2012, pp. 1-3.
Ericsson, ST-Ericsson, "Investigation of PUCCH load," 3GPP TSG RAN WG2 Meeting 78, May 21-25, 2012, pp. 1-9.
Alcatel-Lucent Shanghai Bell, Alcatel-Lucent, "Enhancement for SR procedure by connected UEs," 3GPP TSG RAN WG2 Meeting 77bis, Mar. 26-30, 2012, pp. 1-3.
Nokia Siemens Networks, Nokia Corporation, "PUCCH analysis for EDDA," 3GPP TSG RAN WG2 Meeting 77bis, Mar. 26-30, 2012, pp. 1-3.
"Office Action of China Counterpart Application," issued on Aug. 26, 2015, p. 1-p. 10.

\* cited by examiner

Option1

Option2

Option1

Option2

Option1

Option2

METHOD OF ALLOCATING RESOURCES FOR SCHEDULING REQUEST AND USER EQUIPMENT USING THE SAME AND A CONTROL NODE USING THE SAME

CROSS REFERENCE TO RELATED APPLICATION

This application claims the priority benefit of U.S.A. provisional application Ser. No. 61/646,889, filed on May 14, 2012. The entirety of the above-mentioned patent application is hereby incorporated by reference herein and made a part of specification.

TECHNICAL FIELD

The present disclosure generally relates to a method of allocating radio resources for scheduling request, a user equipment using the same, and a control node using the same.

BACKGROUND

Numerous applications, including "always-on" applications, have required mobile-broadband experience be delivered and presented to end users in a seamless fashion. When an always-on connectivity is provided by a typical radio access network (RAN), trade-offs are often encountered among characteristics such as UE power consumption, data transfer latency, network efficiency, and signaling overhead. Also, the optimum point for each trade-off could vary according to characteristics, activities, or statuses of such applications. Therefore, a specification group, also known as RAN2 which is in charge of the Radio layer 2 and Radio layer 3, has been discussing issues related to handling diverse traffic profiles in the working item eDDA (which stands for enhancements of diversity data applications) for enhancing the Long Term Evolution (LTE) communication system.

One of such current discussions involves utilization of the scheduling request (SR) which is an uplink control signaling, and its function would include requesting a UL-SCH (uplink shared channel) resource for a new transmission. FIG. 1A is a signal flow chart which illustrates using scheduling request to initiate an uplink data transfer through a typical uplink procedure. In step S111, a UE 101 may optionally receive SR configuration from an eNB 102. The SR configuration allocates resources for transferring the actual SR, and the allocation is accomplished by assigning a period between each resource for SR and a subframe offset. The SR configuration is configured by RRC signaling, particularly the sr-ConfigIndex. Currently, the possible SR periods are 1 ms, 2 ms, 5 ms, 10 ms, 20 ms, 40 ms and 80 ms. In step S112, assuming that the UE 101 wants to transmit data and consequently transmits a SR to the eNB 102. In step S113, in response to receiving the SR, the eNB 102 transmits an uplink grant which is used for transmitting a buffer status report (BSR) to the eNB 102. The uplink grant could be obtained by (blindly) decoding the physical downlink control channel (PDCCH). In step S114, the UE 101 transmits the BSR to the eNB 102. In step S115, the eNB 102 transmits an uplink grant in the PDCCH to the UE 101 for transmitting uplink packet or uplink data. In step S116, the UE 101 transmits uplink packets to the eNB 102.

The allocation of SR resources in physical uplink control channel (PUCCH) is illustrates in FIG. 1B. Assuming that the allocation of SR resources is dedicated per UE device, SR source could be named as dedicated SR resource or D-SR resource. When a UE wants to transmit uplink data, a D-SR resource could be utilized to transmit control signaling, namely the SR, in the PUCCH. In FIG. 1B, the D-SR resource could be configured in a periodic manner which would result in lesser control signaling overhead.

However, an uplink grant may also be requested through a random access procedure. For circumstances in which the D-SR resource is no longer valid due to UE time out or when the UE needs to transmit data between D-SR resources, a random access procedure could be utilized. FIG. 1C is a signal flow chart which illustrates requesting an uplink grant through a conventional random access procedure. In step S121, an UE 101 transmits a random access preamble or a sequence of predefined codes to a eNB 102 to request for a random access (RA). In step S122, in response to receiving the random access request, the eNB 102 transmits a random access response (RAR) which includes an uplink grant specifically for Msg3 to the UE 101. In step S123, the UE 101 transmits to the eNB 102 which may include a C-RNTI, and optionally user data. In step S124, in response to receiving the Msg3, the UE 101 transmits an uplink grant to the UE 101 for a RA-SR resource (i.e. SR resources allocated through RA) in order to transmit a SR.

The allocation of RA-SR resources in physical uplink control channel (PUCCH) is illustrates in FIG. 1D. It should be noted that when a UE 101 request for a uplink grant to transmits user data through a random access procedure, it would require more network resource and power consumption then using D-SR resources. For the procedure of FIGS. 1A and 1B, the UE 101 could use the semi-persistently scheduled D-SR resources to transmit the SR (S112). In this disclosure semi-persistent scheduling means that the D-SR resources are periodically scheduled, but the periodicity could be altered dynamically by a UE or a control node. For the procedure of FIGS. 1C and 1D however, step S124 needs to be finished before the UE 101 could transmit a SR. Therefore, a network could reduce control signaling overhead in favor of the semi-persistent D-SR resource scheduling.

However, according to TR36.822, simulation results have indicated that physical uplink control channel (PUCCH) utilization rate for SR (scheduling request) would most likely be very low for most traffic, especially for background traffic. Background traffic would refer to the autonomous exchanges of user plane data packets between a UE and a network generally in the absence of a specific user interaction with the device. When data traffic contains mostly sparse and small packets, such as background traffic, enhancements to efficiently allocating SR resource for such traffic has been discussed.

In one of the RAN2 meetings, one possible and simple enhancement is the introduction of longer SR periods to increase PUCCH utilization rate for SR. Since the need of SR for background traffic is infrequent, the simulation results in TR36.822 show that less than 1% SR opportunities are used for 80 ms SR period and less than 0.1% SR opportunities are used for 10 ms SR period. Due to the low SR utilization rate, it would make an intuitive sense to consider lengthening the SR period.

However, should the traffic pattern of a UE be changed dynamically, the regularly configured SR period could no longer be appropriate. One reason is that a shortened SR period could result in wasting D-SR opportunities. On the other hand, a lengthened SR period could result in longer transmission delay. Otherwise, additional random access procedures would be needed to request RA-SR resource for situations such as delivering measurements reports, transmitting data belonging to a high priority bearer, or involving delay stringent applications such as gaming. In the foreseeable future, it is very possible that wireless data capability would grow by 1000 times more than the current capacity, improving physical resource utilization rate would become necessary as methods to dynamically allocate PUCCH resource would be needed. Therefore, it would be beneficial to simultaneously consider different factors including at least but not limited to SR utilization rate, NW signaling overhead, power consumption, and corresponding SR transmission delay in order to obtain a method which may accommodate for the rapidly growth of required wireless capacity.

SUMMARY OF THE DISCLOSURE

Accordingly, the present disclosure relates to a method of allocating resources for scheduling request, a user equipment using the same method, and a control node using the same method.

The present disclosure directs to a method of adjusting a dedicated SR (D-SR) period which is a semi-persistently configured D-SR resource used to transmit a SR. The method is adapted for a user equipment and includes the steps of establishing a first connection in order to transmit uplink data, transmitting through the first connection the assisting information in response to receiving the request to transmit the assisting information, and obtaining a second D-SR period after transmitting the assisting information.

The present disclosure directs to a method of adjusting a dedicated SR (D-SR) period which is a semi-persistently configured D-SR resource used to transmit a SR. The method is adapted for a control node and includes the steps of establishing a first connection in order to receive uplink data, obtaining the assisting information in reply to transmitting the request for the assisting information, and determining a second D-SR period based on the assisting information.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1A:
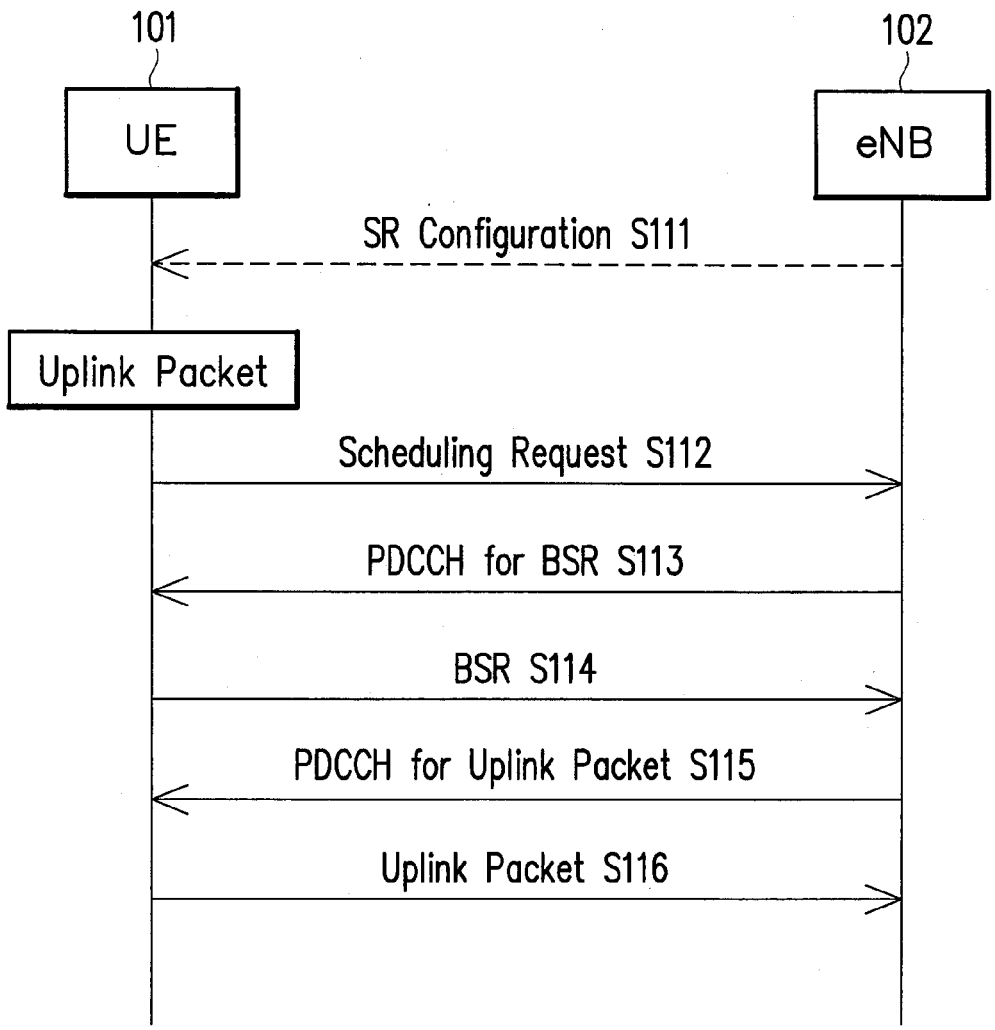
FIG. 1A is a signal flow chart which illustrates using scheduling request to initiate an uplink data transfer through a typical uplink procedure.
Figure 1B:
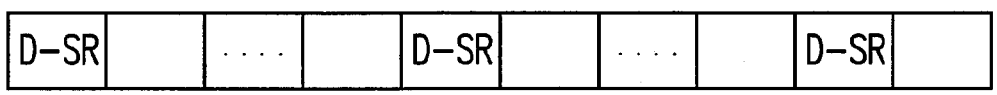
FIG. 1B illustrates the allocation of D-SR resources in the PUCCH.
Figure 1C:
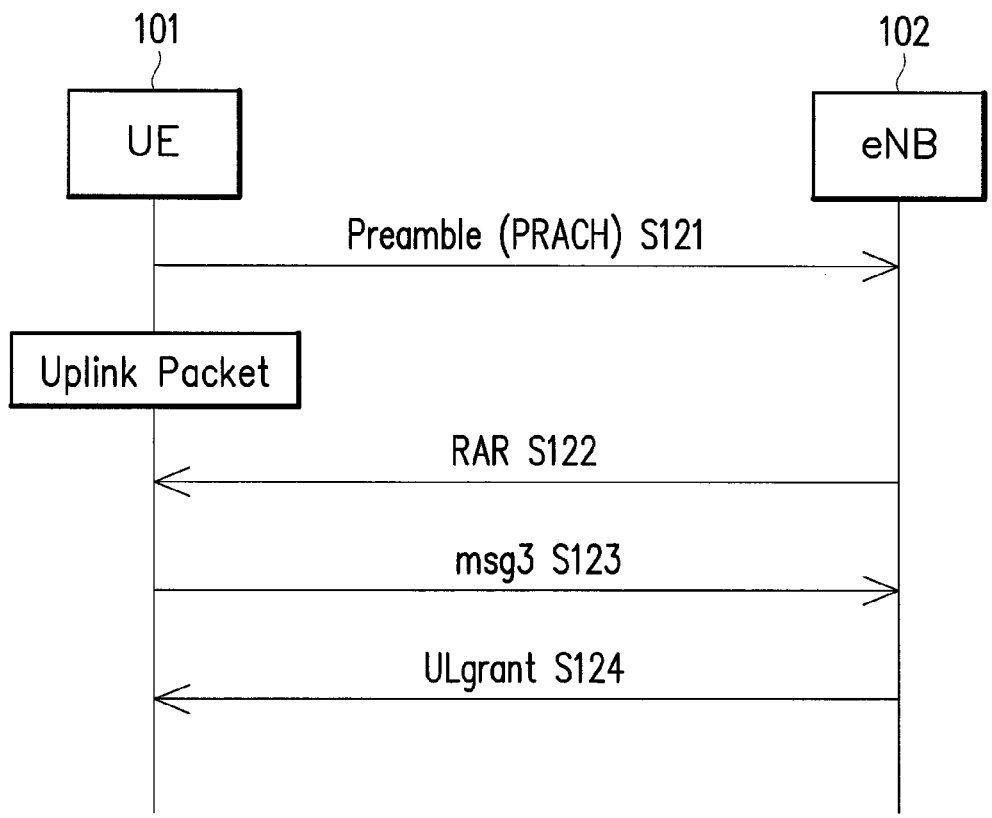
FIG. 1C illustrates initiating an uplink data transfer through a random access procedure.
Figure 1D:
FIG. 1D illustrates the allocation of RA-SR resources in the PUCCH.

No element, act, or instruction used in the description of the present application should be construed as critical or essential to the present disclosure unless explicitly described as such. Also, as used herein, each of the indefinite articles "a" and "an" is intended to exclude more than one item. If only one item is intended, the terms "a single" or similar languages could be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

A control node in this disclosure would be referred to as a base station (BS) or an eNB. It should be noted that the references of such are merely exemplary and therefore do not serve as limitations to the type of control nodes as it would be apparent to those skilled in the art that other types of control node could be selected to achieve network control purposes such as an advanced base station (ABS), a base transceiver system (BTS), an access point, a home base station, a relay station, a repeater, an intermediate node, an intermediary, and/or satellite-based communication base stations.

The control node may also be referred to entities such as a Mobility Management Entity (MME), a Serving Gateway (S-GW), a Packet Data Network Gateway (PDN-GW), a Serving GPRS Support Node (SGSN), a Gateway GPRS Support Node (GGSN), a Mobile Switching Center (MSC), and a Home Subscriber Server (HSS) or a node maintaining a database related to subscriber information.

From the hardware perspective, a control node for all the embodiments may also be referred to as an apparatus including at least but not limited to a transmitter circuit, a receiver circuit, an analog-to-digital (A/D) converter, a digital-to-analog (D/A) converter, a processing circuit, one or more antenna units, and optionally a storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The processing circuit is configured to process digital signal and to perform procedures related to the proposed method in accordance with exemplary embodiments of the present disclosure. Also, the processing circuit may optionally be coupled to a memory circuit to store programming codes, device configurations, a codebook, buffered or permanent data, and etc. The functions of the processing circuit may be implemented using programmable units such as a micro-processor, a micro-controller, a DSP chips, FPGA, etc. The functions of the processing circuit may also be implemented with separate electronic devices or ICs, and the processing circuit may also be implemented with either hardware or software.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

From the hardware perspective, a UE for all the embodiments may also be referred to as an apparatus which includes at least but not limited to a transmitter circuit, a receiver circuit, an analog-to-digital (A/D) converter, a digital-to-analog (D/A) converter, a processing circuit, one ore more antenna units, and optionally a memory circuit. The memory circuit may store programming codes, device configurations, buffered or permanent data, codebooks, and etc. . . . . . The processing circuit may also be implemented with either hardware or software. The function of each element of a UE is similar to a control node and therefore detailed descriptions for each element will not be repeated.

The present disclosure proposes a method of dynamically allocating PUCCH resource for SR which could be used to request for an uplink grant to transmit a BSR, and the allocation decision would be made by a control node based on the behavior of a UE and/or based on information provided by a UE to assist a control node to make a proper dynamic resource allocation decision.

More specifically, assuming that a UE has established a RRC connection or a radio bearer related connection with a control node in order to transmit uplink data to the control node which will be more specifically referred to as a base station or eNB from this point on, the UE and/or the base station would maintain information related to the network usage behavior of the UE or other information such SR transmission delay or an inter-arrival time (IAT) distribution in order to determine whether to adjust the current D-SR period. The information related to the network usage behavior of the UE could be the D-SR resource utilization rate, or it could be the number of RA successes. In general, if the D-SR period is too short, D-SR resources could be wasted; whereas if the D-SR period is too long, the number of RA requests would increase or the overall transmission delay may increase. Therefore, the present disclosure proposes a method to optimize the transmission of the SR through various dynamic adjustments mechanisms.

Dynamic adjustments could be made to the semi-persistent D-SR period based on the D-SR utilization rate in a periodic measurement period. In other words, the D-SR period could be lengthened if the D-SR resource is hardly utilized or if the D-SR utilization rate is below a certain threshold. On the other hand, the D-SR period could be shortened if the D-SR resource is frequently used as the D-SR utilization rate is above a threshold. The periodic measurement period could be a number of subframes and could be decided by either a UE or a base station.

Similarly, the number of RA successes within a predetermined measurement period could also be used to determine whether to adjust the D-SR period. If the number of RA successes within the predetermined measurement period exceeds a certain threshold, the D-SR period could be shortened so that a UE does not have to wait in between D-SR resources. If the number of RA successes fall below a certain threshold, the D-SR period could be lengthened. Therefore, the UE behavior could be characterizes according to at least but not limited to the D-SR resource utilization rate or the number of RA successes or the combination of both.

Figure 2:
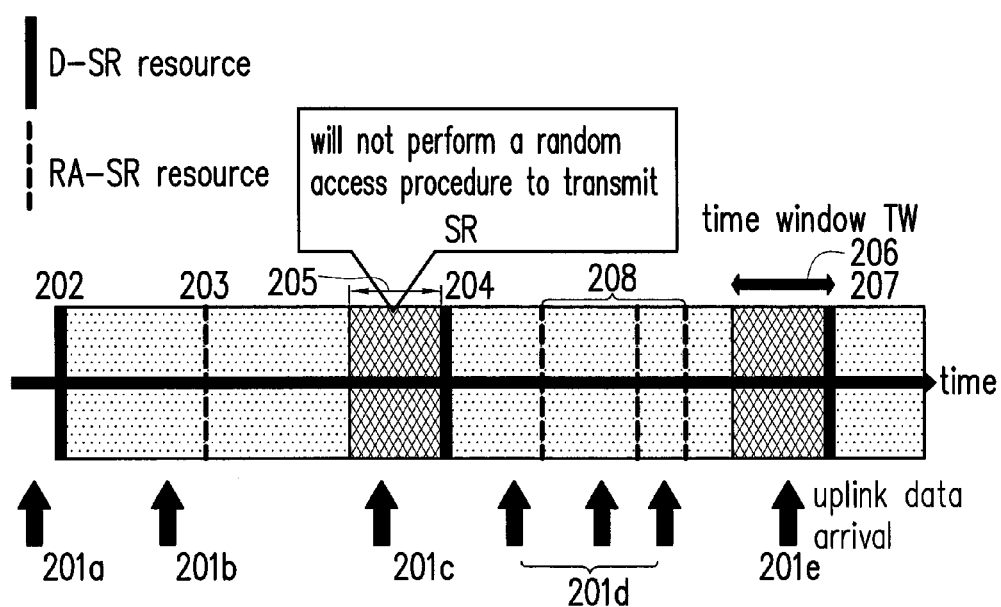
FIG. 2 illustrates the timing diagram of the scenario in which D-SR and RA-SR resources are both present under a default configured SR period in accordance with one of the exemplary embodiment of the present disclosure.

FIG. 2 illustrates the timing diagram of the scenario in which D-SR and RA-SR resources are both present under a default configured SR period in accordance with one of the exemplary embodiment of the present disclosure. The timing diagram of FIG. 2 is illustrated from the perspective of a UE. The horizontal axis in FIG. 2 is the time axis. The designators 201a~201e represents uplink data arrivals at various points in time. The solid vertical lines such as 202, 204 and 207 represent the availability of D-SR resources in different points in time. Please note that the D-SR resources are periodically scheduled in a semi-persistent manner, and a D-SR period is the time between the allocation of two regularly scheduled D-SR resources. The dotted vertical lines, 203 and 208 represent the allocation of RA-SR resources.

For every D-SR period, there is a predefined time window during which a random access is not permitted. The predefined time window would be 205 & 206 as illustrated in FIG. 2 and would span from the end of a period to a predefined length of time before the end of a period. If a SR is triggered by an incoming uplink data arrival and assuming that a D-SR resource would be available within the pre-defined time window TW 205 & 206, the UE would then transmit this triggered SR by using the incoming D-SR resource. The predefined time window TW would prevent a UE to request a RA-SR resource that is followed by a D-SR resource in the very near future, and the pre-defined time TW could configurable in terms of a fraction of a configured SR period or the time required to complete a RA procedure. A UE may otherwise perform random access procedure in the next available RA opportunity to ask for RA-SR resource and then transmit this triggered SR by using the RA-SR resource unless the timing of the RA request falls within the predefined time window TW.

When a UE wants to transmit an uplink data which arrives at time point 201a, a UE may use the D-SR resource 202 to transmit a SR. When an arriving uplink data is imminent at time point 201b which is in between a D-SR period, the UE may use the RA-SR resource 203 so that the UE does not have to wait for the next D-SR resource. When an arriving uplink data is imminent at time point 201c, RA would not be performed during the time window 205 and the SR would be transmitted using the next D-SR resource 204. During various time points 201d, scheduling requests could be transmitted using RA-SR resources 208. At time point 201e, the SR would be transmitted using the D-SR resource 207 instead of a RA-SR resource during the TW 206.

Figure 3:
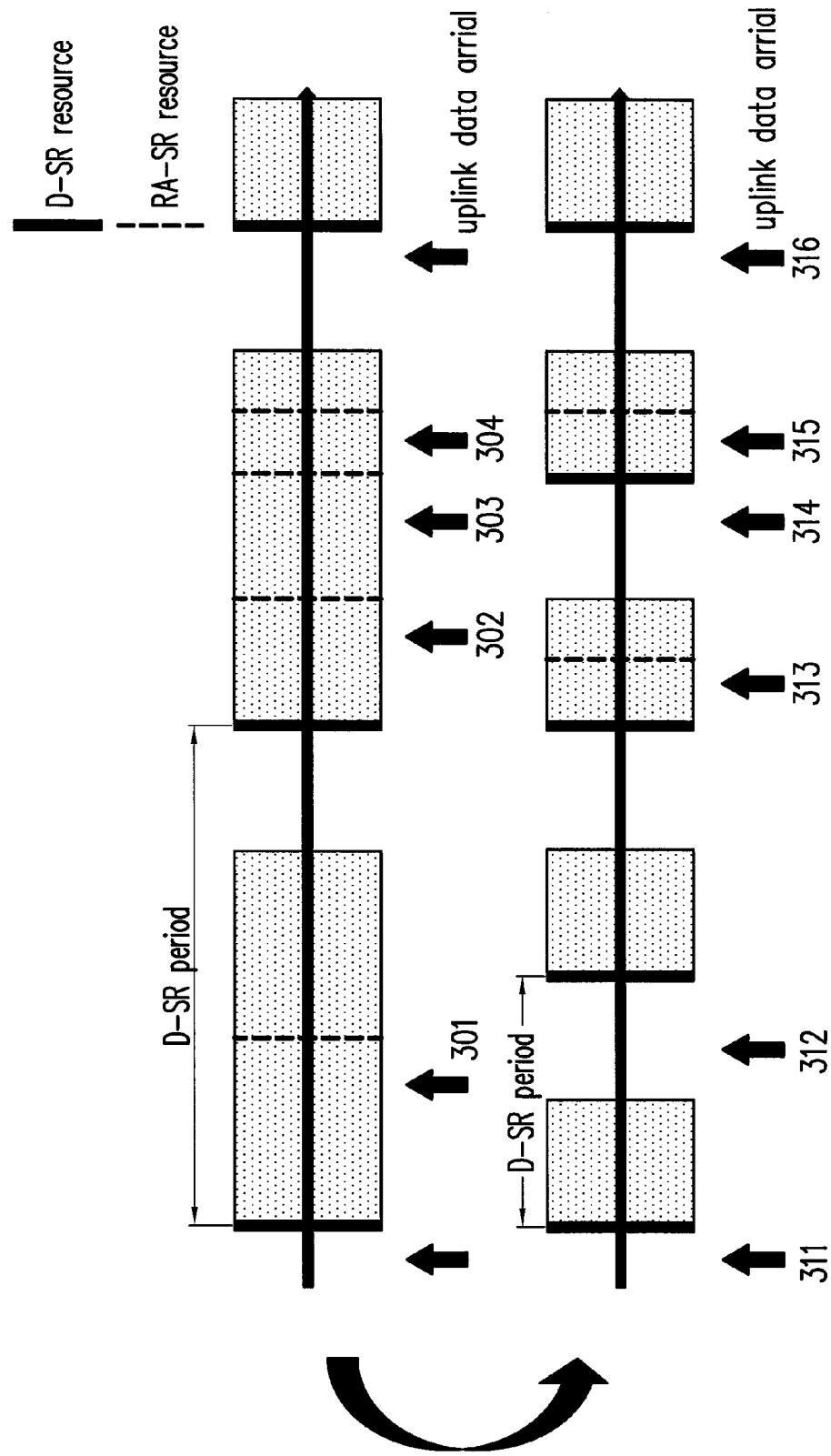
FIG. 3 illustrates dynamic SR source allocation in PUCCH by shortening the current D-SR period in accordance with one of the exemplary embodiment of the present disclosure.

FIG. 3 illustrates dynamic SR source allocation in PUCCH by shortening the current D-SR period in accordance with one of the exemplary embodiment of the present disclosure. Evaluations as for whether to shorten the current D-SR period could be made based on at least two criteria related to UE behaviors—one is D-SR resource utilization rate and the other is the number of RA successes. If a number of RA procedure successes exceed a shortening constraint or a predetermined threshold within a predetermined measurement period, or if an average of the number of RA procedure successes exceed a shortening constraint or a predetermined threshold within a predetermined measurement period, then the D-SR period could be shortened. The predetermined measurement period and the predetermined threshold could be configurable or predefined in advance for both UE and eNB such as before they are in the RRC connected state or offline. Once the shortening constraint is satisfied, the current D-SR period could be directly shortened to a next possible level such as from 80 ms to 40 ms as defined by the current LTE/LTE-A standard or shortened according to any possible shorter D-SR period.

For the scenario of FIG. 3, it is assumed for exemplary purpose that the measurement period is 2 D-SR periods and the shortening constraint is 3 RA successes. Assuming that the top diagram contains 4 uplink data arrivals 301 302 303 304 within two D-SR periods, and the 4 uplink data arrivals result in 4 RA successes which would exceed the shortening constraint predetermined as 3 RA successes, and hence the D-SR period would be shortened according to the bottom diagram. For the bottom diagram, only two RA-SR resources for the scheduling requests triggered by 2 uplink data arrivals 313 315 would be required while the shortened D-SR period would accommodate SR for uplink data arrivals 311, 312, 314, 316 with D-SR resources and thus control signaling overhead due to RA procedures could be reduced. Also the same concept could be extended to D-SR utilization rate by analogy. If the percentage of D-SR sources is utilized beyond a threshold, then the D-SR period would be shortened. Please note that although the mechanism and the corresponding shortening constraint could be designed based on UE behavior such as RA procedure successes and D-SR resource utilization rate, the shortening constraint is not limited to these two criteria but could be used in conjunction with other embodiments of the present disclosure.

Figure 4:
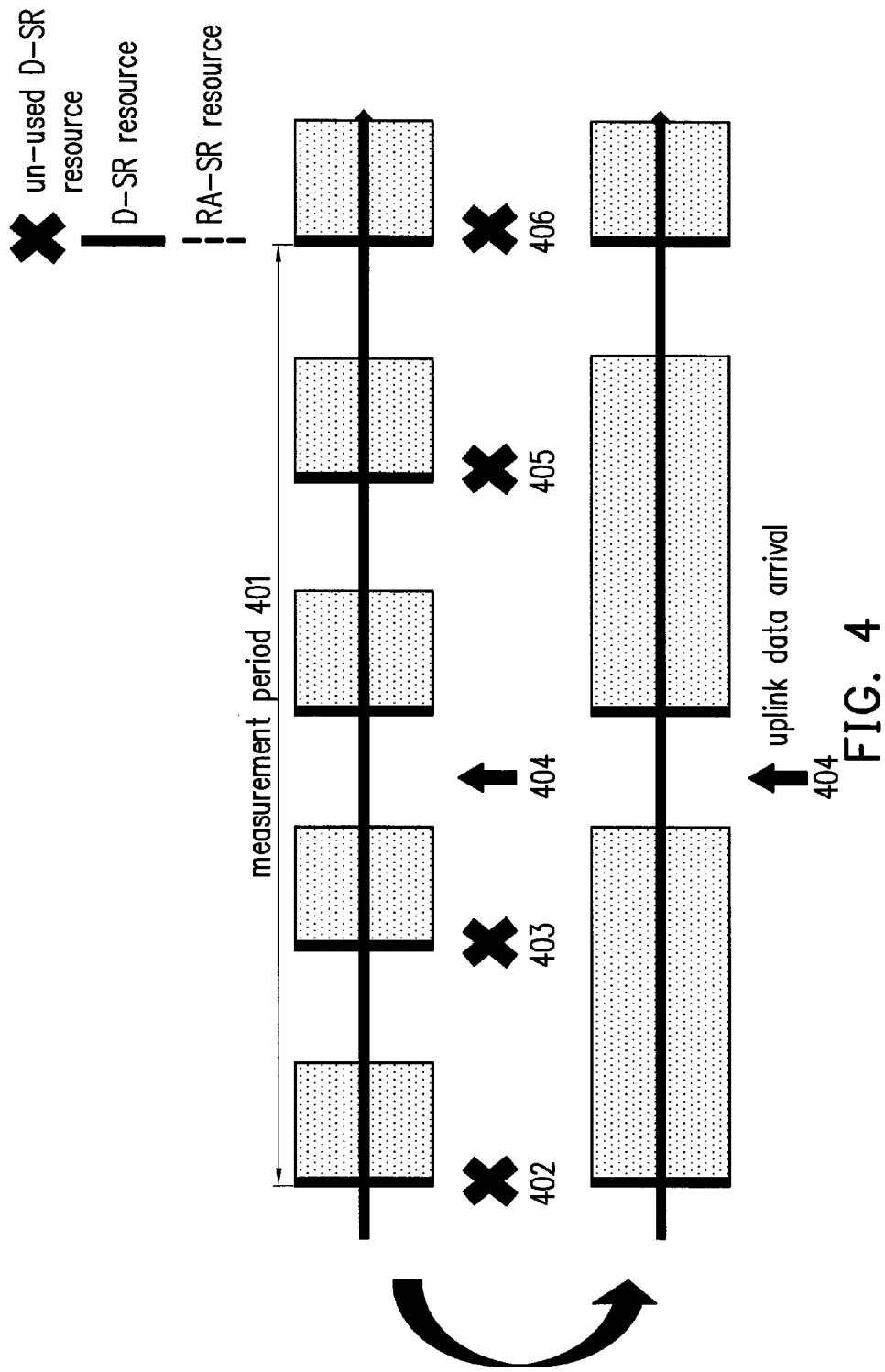
FIG. 4 illustrates dynamic SR source allocation in PUCCH by lengthening the current D-SR period in accordance with one of the exemplary embodiment of the present disclosure.

Likewise, FIG. 4 illustrates dynamic SR source allocation in PUCCH by lengthening the current D-SR period in accordance with one of the exemplary embodiment of the present disclosure. In order to extend the D-SR period, the utilization rate of D-SR would fall below a lengthening constraint within a predetermined measurement period. For the scenario of FIG. 4, assuming for exemplary purpose that the predetermined measurement period is 4 D-SR periods, the number of D-SR resources with the predetermined measurement period is 5, and the lengthening utilization rate is 25%, the D-SR period would be lengthened if D-SR utilization falls below 25%. FIG. 4 shows that in the measurement period 401, one D-SR resource for uplink data arrival 404 is utilized while 4 other D-SR resources 402 403 405 406 for uplink data arrival are not utilized. This translates to a 20% utilization rate which falls below the lengthening constraint and hence the D-SR period would be lengthened. It should be noted that the same concept may apply for an average of utilization rate over a number of periods. Also it would be apparent to persons skilled in the art to extend the same concept to the number of RA successes by analogy, and hence similar disclosure will not be repeated. Once an extension constraint is satisfied, the D-SR period could be extended directly to a next level (e.g. 40 ms to 80 ms) or any longer D-SR period. The length of measurement period and the extension constraint may also be configurable or pre-defined in advance for both UE and eNB. Please note that although the mechanism and the corresponding lengthening constraint could be designed based on UE behavior such as RA procedure successes and D-SR resource utilization rate, the lengthening constraint is not limited to these two criteria but could be used in conjunction with other embodiments of the present disclosure.

In order to coordinate between an eNB and a UE to adjust the current D-SR period, the present disclosure proposes two mechanisms. One is a RRC-based mechanism, and the other is a non-RRC-based mechanism. For the RRC-based mechanism, once the shortening constraint is satisfied, an eNB may send the RRC signal sr-ConfigIndex to configure UE the second D-SR period. Similarly, once the lengthening constraint is satisfied, eNB may send the RRC signal sr-ConfigIndex to extend the D-SR period. Although the RRC-based solution would increase RRC signaling overhead, it would provide the ability for an eNB to fully control D-SR resource allocation.

On the other hand, a non-RRC-based solution would reduce the volume of RRC signals. For the non-RRC-based solution, once the shortening constraint is satisfied, both UE and eNB may shorten the D-SR period according to a pre-defined rule without additional communication such as additional RRC signalings or other control signalings to setup the updated D-SR period. Similarly, once the lengthening constraint has been satisfied, both UE and eNB may extend the D-SR period according to a pre-defined rule without additional communication to setup the updated D-SR period. The pre-defined rules could be a lookup table or could be predefined for an eNB or a UE in advance or could be given by an eNB when a UE is RRC connected to an eNB. In order to ensure that the network remains in control of the D-SR resource allocation, the eNB could abort the non-RRC-based solution and instead send a RRC signal to start the RRC-based solution with the new RRC signal sr-ConfigIndex. The eNB may also restart the non-RRC-based solution by sending a different RRC signal.

In another exemplary embodiment, a UE may dynamically adjust the current D-SR period by selecting a SR configuration from a list of discrete D-SR period candidate choices provided by an eNB. The UE may make the selection from the list of candidate choices based on D-SR resource utilization rate or RA successes as mentioned previously. The UE may also make the selection based on other factors such as SR transmission delay or an inter-arrival time (IAT) distribution. The UE may make the selection simply based on trial and error.

Figure 5A:
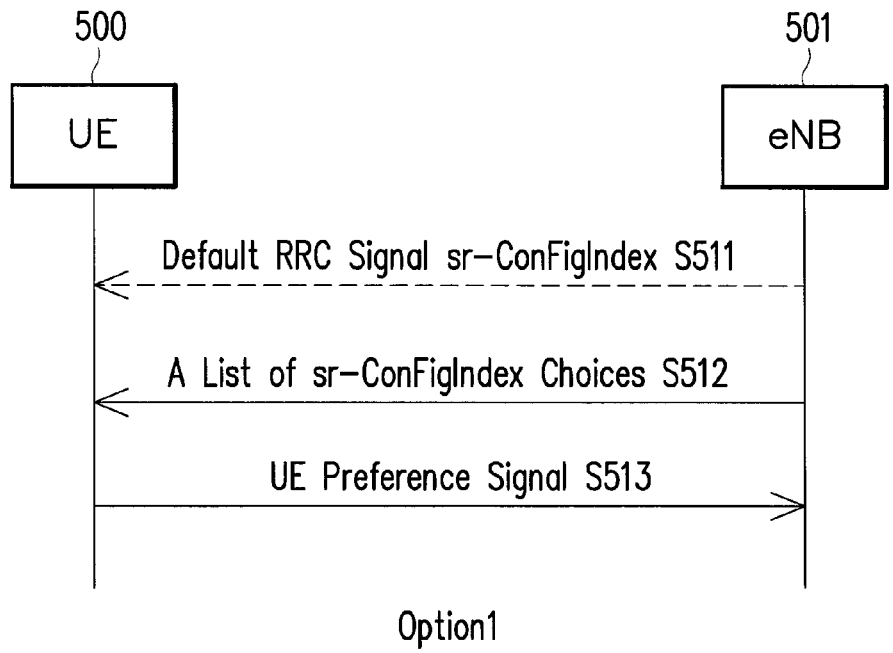
FIGS. 5A and 5B are signal flow charts which illustrate a UE selecting a SR configuration from a list of choices provided by eNB in accordance with one of the exemplary embodiment of the present disclosure.
Figure 5B:
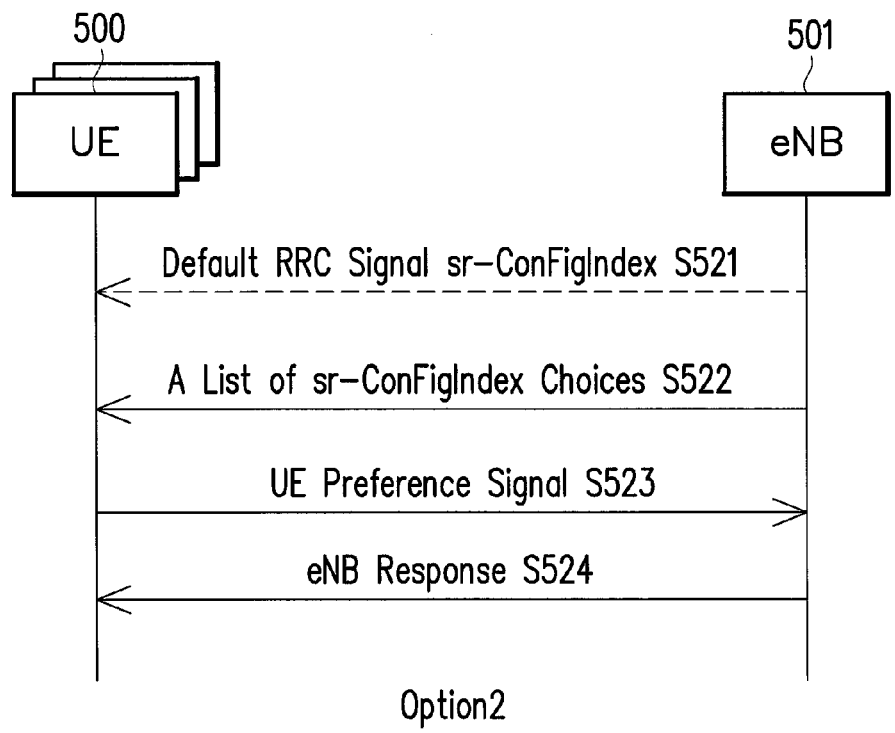

FIGS. 5A and 5B are signal flow charts which illustrate a UE selecting a SR configuration from a list of choices provided by eNB in accordance with one of the exemplary embodiment of the present disclosure. FIG. 5A shows option 1 which is a signal flow chart between a UE 500 and an eNB 501, and FIG. 5B shows option 2 which is similar to option 1 but contains one more step. In step S511, the eNB 501 may configure the default D-SR period through a RRC signaling, namely the sr-ConFigIndex. In step S512, the eNB 501 transmits the RRC signaling such as a list of the sr-ConFigIndex to the UE 500 to provide the UE 500 a number of choices to select a preferred D-SR period. In step S513, the UE 500 makes a selection from the list of candidates as the preferred D-SR period by transmitting to the eNB 501 the preference of the UE 500. In response to receiving the preference from the UE 500, the eNB may simply adjust the D-SR period configuration according to the preference.

The option 2 of FIG. 5B is similar to FIG. 5A such that steps S521, S522 and S523 are similar to steps S511, S512, and S513 respectively except that in response to receiving the preference signal, the eNB 501 may transmit an additional eNB response signal in step S524 to inform the UE 500 of a second D-SR period to be configured. For option 2 of FIG. 5B, the second D-SR period might not be the same as the preferred D-SR period which is indicated by preference of the UE 500. In this way, the network may still remain in control of D-SR resource allocation.

The RRC signal such as a list of sr-ConFigIndex which would provide a list of candidate D-SR periods could be transmitted to the UE 500 on a regular basis according to a predetermined period, or the list of sr-ConFigIndex could be triggered by the UE 500 by occasion. For instance, when the shortening criteria or lengthening criteria or other criteria has been met, the UE 500 may transmit a user command to trigger the eNB 501 to provide the candidate D-SR period list through the sr-ConFigIndex. The UE 500 may then transmit its preference to the eNB 501.

In another exemplary embodiment, the current D-SR period could be dynamically adjusted based on a UE sending assisting information to an eNB for the purpose of assisting an eNB to adjust the current D-SR period. The assisting information could be based on SR transmission delay or an inter-arrival time (IAT) distribution. In general, an eNB may configure a default D-SR period to an UE through a RRC signal such as sr-ConfigIndex. When the default D-SR period does not satisfy the UE, such as at least one of the D-SR resource utilization rate, RA successes, SR transmission delay, and IAT distribution being sub-optimal, the UE could transmit assisting information to the eNB. The UE assistant information could also be sent from the UE 600 periodically or triggered by the eNB 601 based on a control command. The eNB could then configure the second D-SR period directly based on the assisting information, or the eNB may ignore the assisting information from the UE and configure the second D-SR period on its own.

Figure 6A:
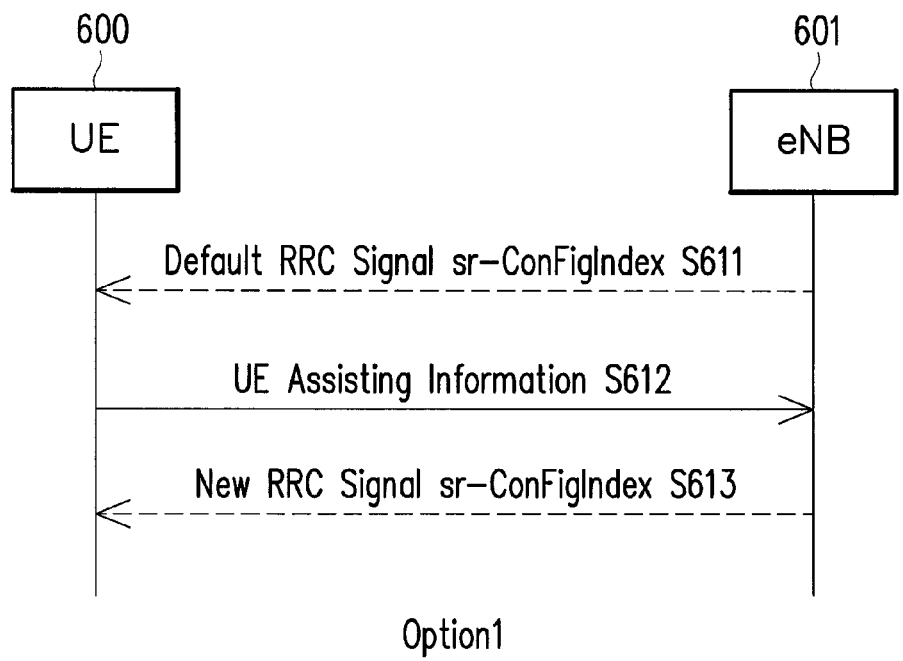
FIGS. 6A and 6B are signal flow charts which illustrate providing UE assistant information for eNB to decide a proper SR configuration in accordance with one of the exemplary embodiment of the present disclosure.
Figure 6B:
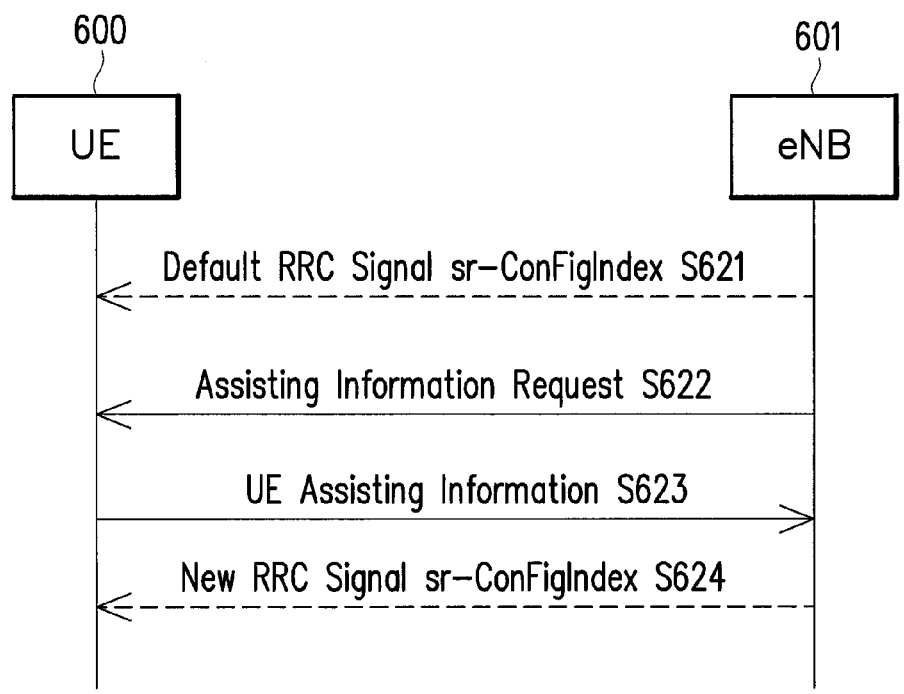

FIGS. 6A and 6B are signal flow charts which illustrate providing UE assistant information for eNB to decide a proper SR configuration in accordance with one of the exemplary embodiment of the present disclosure. FIG. 6A is the flow chart for option 1. In step S611, an eNB 601 configures a default D-SR period for a UE 600 through a RRC signal, which could be sr-ConFigIndex. In step S612, the UE 600 transmits UE assisting information to the eNB 601. In step S613, in response to receiving the UE assisting information, the eNB 601 transmits a RRC sr-ConFigIndex to configure a second D-SR period. FIG. 6B is the flow chart for option 2. For option 2, steps S621, S623, and S624 are similar to steps S611, S612, and S613 respectively, except for step S622. In step S622, the eNB 601 may transmit an assisting information request S622 to the UE 600 to request for information to assist the eNB 601 to configure a second D-SR period.

In accordance with another embodiment, SR resources could be dynamically allocated based on a request for a temporary SR resource (T-SR resource). Specifically, a UE uses piggyback technique to ask for T-SR resource. Also for this embodiment, a UE would not be allowed to request a T-SR resource once a D-SR resource is coming soon such as a D-SR resource would be readily available in next subframe, in a subframe coming soon, or within a specified time window. T-SR resource allocation would not affect the current D-SR configuration. According to one variation, as soon as an eNB receives a T-SR resource request, the T-SR resource could be considered known and allocated to requesting UE implicitly without exchanges of control signalings. The implicit allocation would be based on a pre-defined rule. In other words, by applying the predefined rule, the UE may know the position and timing of the T-SR resource. The predefined rule may also be transmitted from an eNB to a UE and could be altered by the eNB or estimated by the eNB using criteria such as the SR transmission history or UE assisting information. The formats of the pre-dined rule may include at least but not limited to the fixed T-SR resource for each T-SR resource request in a D-SR period without considering the timing of T-SR resource request, the dynamic T-SR resource for each T-SR resource request by considering the timing of T-SR resource request, (i.e., the T-SR resource will be available on the next k subframes, where k is a constant), and the dynamic T-SR resource for each T-SR resource according to a predefined table for all cases. In the case that no predefined rules exist, an eNB would send a TSR resource response message to allocate TSR resource for the UE for each T-SR resource request.

Figure 7A:
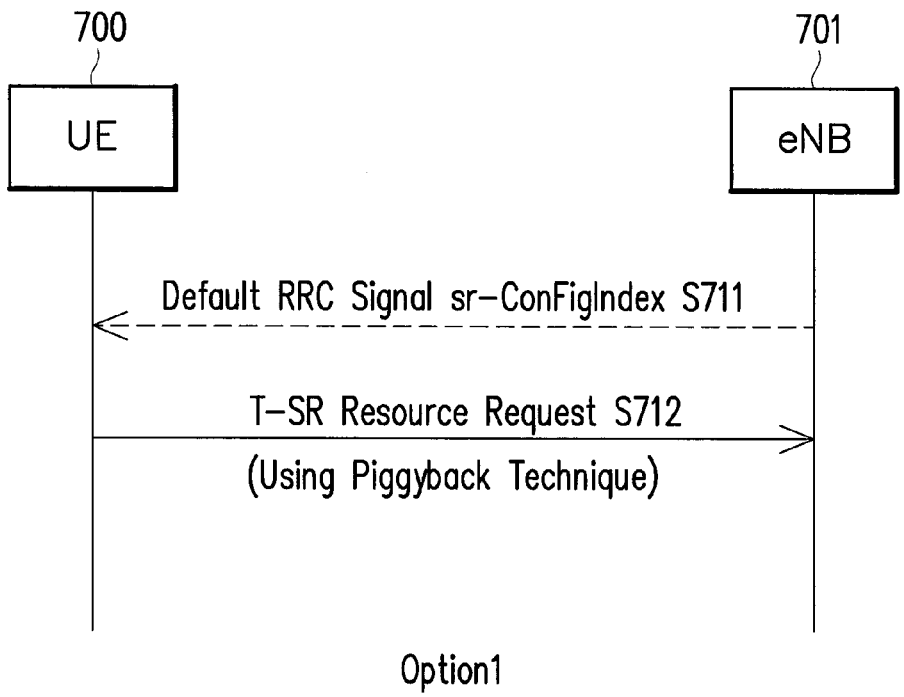
FIGS. 7A and 7B are signal flow charts which illustrate dynamically assigning a temporary SR resource in response to a request by a UE in accordance with one of the exemplary embodiment of the present disclosure.
Figure 7B:
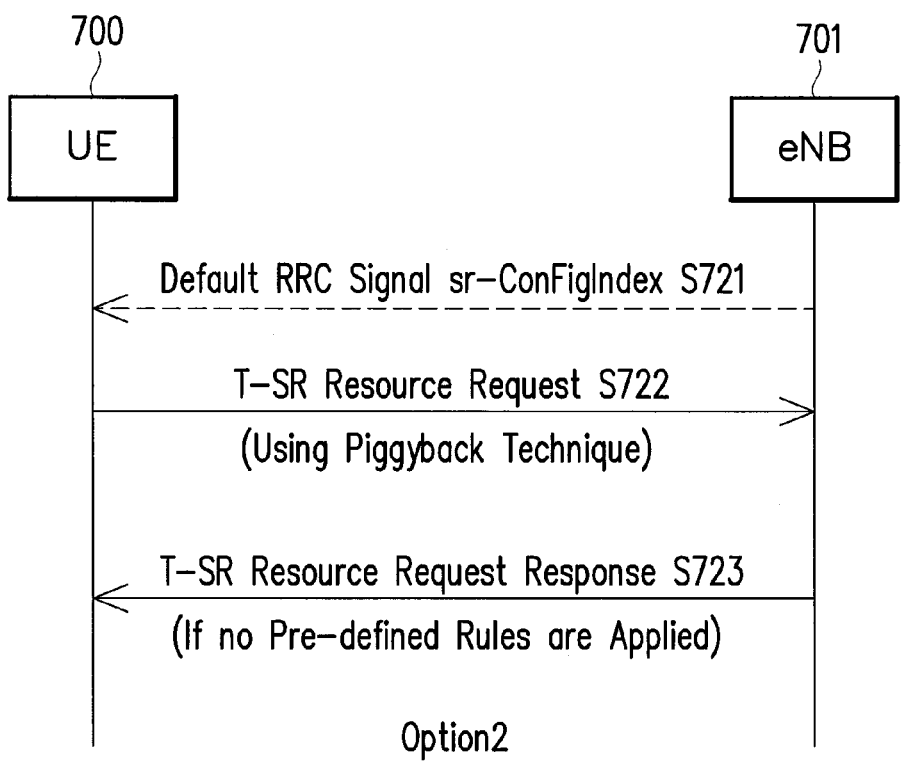

FIGS. 7A and 7B are signal flow charts which illustrate dynamically assigning a temporary SR resource in response to a request by a UE in accordance with one of the exemplary embodiment of the present disclosure. In option 1 as illustrated by FIG. 7A, in step S711, an eNB 701 configures a default D-SR period through a RRC signal such as sr-ConFigIndex for the UE 700. In step S712, the UE 700 transmits a T-SR resource request to the eNB 701 in order to request for a temporary SR. The T-SR request in step S712 could be made using a piggyback technique. For option 2 as illustrated by FIG. 7B, step S721 is the same as step S711, and step S722 is the same as step S712. Option 2 further includes an additional step S723 in which the eNB 701 transmits a TSR resource request response to the UE 700 in response to receiving the T-SR request in step S722.

It should be noted that piggyback means that data could be embedded (or "piggyback") in a signaling which would normally be intended for another purpose. For instance, referring to FIG. 1, the scheduling request in step S112 and the BSR in step S114 could be piggybacked into step S116 which is to transmit uplink packet. When there is sufficient space or left over space in PUSCH, the scheduling request or BSR could be piggybacked in left over spaces in PUSCH such that steps S112, S113, and S114 could be eliminated when the T-SR resource request is to be made.

Figure 8A:
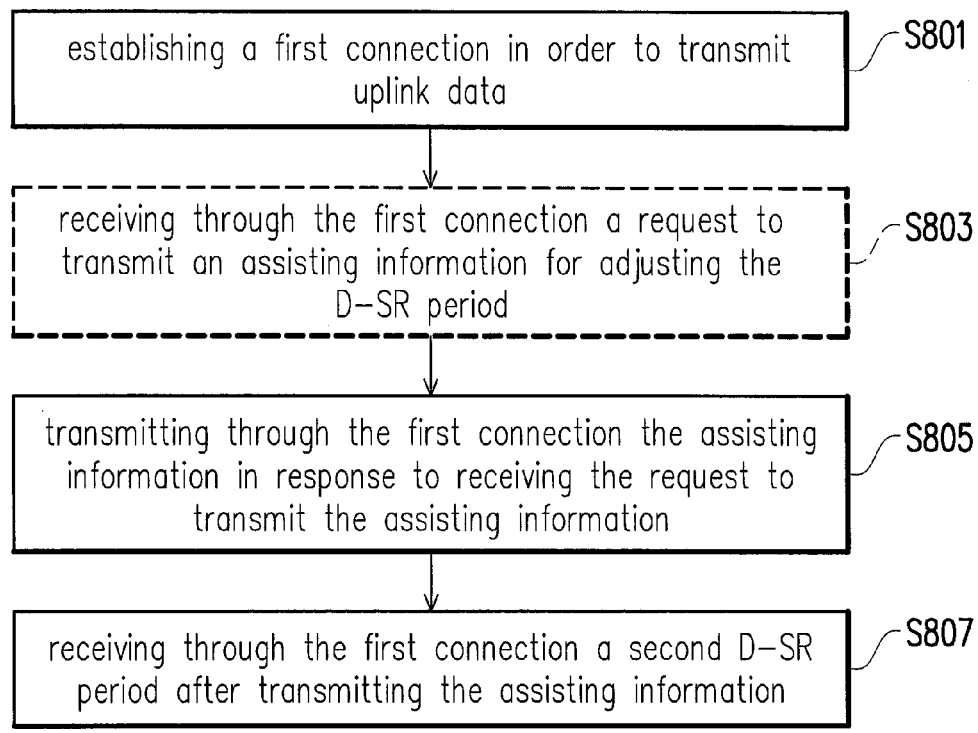
FIG. 8A illustrates the method of adjusting the D-SR period which is a semi-persistently configured D-SR resource used to transmit a SR from the perspective of a user equipment in accordance with one of the exemplary embodiment of the present disclosure.

In view of all the aforementioned features, an implementation could proceed as follows. FIG. 8A illustrates the method of dynamically adjusting the D-SR period which is a semi-persistently configured D-SR resource used to transmit a SR from the perspective of a UE in accordance with one of the exemplary embodiment of the present disclosure. In step S801, the UE establishes a first connection in order to receive uplink data from an eNB. The first connection could be a RRC type of connection. In an optional step S803, the UE may receive through the first connection a request to transmit an assisting information for adjusting the D-SR period. The eNB may adjust the second D-SR period based on the assisting information or the eNB may ignore the assisting information and configure the second D-SR period based on its own consideration. The request could be a request for UE information such as D-SR utilization ratio, RA successes, SR transmission delay, or an inter-arrival time (IAT) distribution. The request for UE assisting information could also be a list of D-SR period for the UE to choose from. In step S805, the UE transmits the UE assisting information in response to receiving the request. In step S807, the UE may obtain a second D-SR period from the eNB after transmitting the assisting information. Or in an alternative embodiment, the UE may adjust D-SR period on UE's own accord after transmitting the assisting information.

Figure 8B:
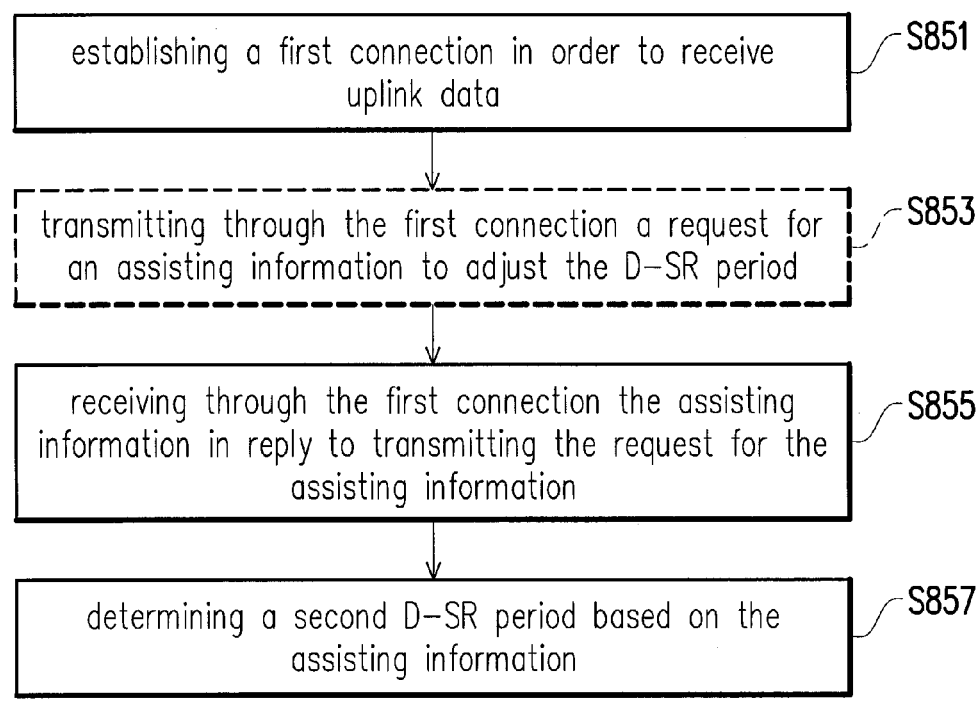
FIG. 8B illustrates the method of adjusting the D-SR period which is a semi-persistently configured D-SR resource used to transmit a SR from the perspective of a control node in accordance with one of the exemplary embodiment of the present disclosure.

FIG. 8B illustrates the method of dynamically adjusting the D-SR period which is a semi-persistently configured D-SR resource used to transmit a SR from the perspective of a control node such as an eNB in accordance with one of the exemplary embodiment of the present disclosure. In step S851, the eNB establishes a first connection in order to receive uplink data. In step S853, the eNB transmits through the first connection a request for a UE assisting information to adjust the D-SR period. In step S855, the eNB receives through the first connection the assisting information in response to transmitting the request. In step S857, the eNB may determine the second D-SR period based on D-SR utilization ration, RA successes and/or the assisting information such as the SR transmission delay or inter-arrival time, and then the eNB may configure and inform the UE the second D-SR period. Or in an alternative embodiment, the eNB may allow UE adjusting the current D-SR period to the second D-SR period on UE's own accord after transmitting the assisting information and would know the second D-SR based on the predefined rules.

For all the figures of all embodiments, a dotted line signifies that the procedure could be optional.

In view of the aforementioned descriptions, the present disclosure is able to optimize transmission delay and signaling overhead by dynamically adjusting D-SR resource based on UE behavior or UE assisting information.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In, addition, use of the term "means" in any claim is intended to invoke 35 U.S.C. §112, ¶6, and any claim without the word "means" is not so intended.

What is claimed is:

1. A method of adjusting a dedicated scheduling request (D-SR) period which is a semi-persistently configured D-SR resource used to transmit a scheduling request (SR), adapted for a user equipment (UE), and the method comprises:
    establishing, by the UE, a first connection in order to transmit uplink data;
    transmitting, by the UE, through the first connection an assisting information after establishing the first connection to adjust the D-SR period; and
    obtaining, by the UE, a second D-SR period after transmitting the assisting information,
    wherein there is a predefined time window during which a random access is not permitted within the both D-SR period and the second D-SR period,
    wherein further comprising:
        transmitting a first message which includes a request for a temporary SR (T-SR) resource according to a piggyback technique; and
        transmitting the SR using the T-SR resource.

2. The method of claim 1, wherein before the step of transmitting through the first connection the assisting information, claim 1 further comprises:
    receiving through the first connection a request to transmit an assisting information for adjusting the D-SR period.

3. The method of claim 2, wherein the request is through a Radio Resource Control (RRC) signaling, and the request comprises one of a list of discrete D-SR period candidates, an inter-arrival time (IAT) distribution, and a SR transmission delay.

4. The method of claim 3, wherein the assisting information comprises a preferred D-SR period selected from the list of discrete D-SR period candidates.

5. The method of claim 3, wherein the RRC signaling is a list of sr-ConFigIndex.

6. The method of claim 4, wherein the step of obtaining the second D-SR period after transmitting the assisting information comprises:
    receiving through the first connection from a control node the second D-SR period in reply to transmitting the preferred D-SR period selected from the list of discrete D-SR period candidates.

7. The method of claim 4, wherein the step of obtaining a second D-SR period after transmitting the assisting information comprises:
    configuring the second D-SR period using the preferred D-SR period without informing a control node.

8. The method of claim 1 further comprises:
    recording a first quantity of D-SR utilization during a first measurement period for adjusting the D-SR period.

9. The method of claim 8 further comprises:
    recording a second quantity of random access (RA) success during the first measurement period for adjusting the D-SR period.

10. The method of claim 8 further comprising:
    adjusting the D-SR period by producing an updated D-SR period which is lengthened when the first quantity falls below a first threshold.

11. The method of claim 10 further comprising:
    adjusting the D-SR period by producing the updated D-SR period which is shortened when the second quantity exceeds a second threshold.

12. The method of claim 11 further comprising:
configuring the second D-SR period using the updated D-SR period without informing a control node.

13. The method of claim 8, wherein the first measurement period is either determined by the UE or pre-configured by the UE or by a control node before the step of establishing the first connection to transmit the uplink data.

14. The method of claim 1, wherein the step of establishing the first connection in order to transmit uplink data further comprises:
receiving the D-SR period through a RRC signaling, wherein, the D-SR period is a default D-SR period.

15. The method of claim 1, wherein the first connection is a RRC connection or a radio bearer related connection.

16. The method of claim 1, wherein the assisting information further comprises at least one of a SR transmission delay or an inter-arrival time (IAT) distribution.

17. The method of claim 1, wherein the SR is used for requesting an uplink grant to transmit a buffer status report (BSR).

18. The method of claim 1 further comprising:
transmitting the SR using the T-SR resource which is known based on a predefined rule when the predefined rule exists to implicitly define the T-SR resource.

19. The method of claim 18 further comprising:
receiving a response from a control node for the request for the T-SR resource when no predefined rule exists to implicitly define the T-SR resource.

20. The method of claim 18 further comprising:
receiving the predefined rule either from a control node or be defined based on the assisting information.

21. The method of claim 1 wherein the user equipment comprises a transmitter and a receiver for respectively transmitting and receiving wireless data, and a processing circuit coupled to the transmitter and the receiver and is configured for executing the steps of claim 1.

22. A method of adjusting a dedicated scheduling request (D-SR) period which is a semi-persistently configured D-SR resource used to transmit a scheduling request (SR), adapted for a control node, and the method comprises:
establishing, by the control node, a first connection in order to receive uplink data;
receiving, by the control node, through the first connection an assisting information after establishing the first connection to adjust the D-SR period; and
determining, by the control node, a second D-SR period based on the assisting information,
wherein there is a predefined time window during which a random access is not permitted within both the D-SR period and the second D-SR period,
wherein further comprising:
receiving a first message which includes a request for a temporary SR (T-SR) resource according to a piggyback technique; and
receiving a SR which uses the T-SR resource.

23. The method of claim 22, wherein before receiving through the first connection the assisting information, further comprises transmitting through the first connection a request for the assisting information to adjust the D-SR period.

24. The method of claim 23, wherein the request is through a Radio Resource Control (RRC) signaling, and the request comprises one of a list of discrete D-SR period candidates, an inter-arrival time (IAT) distribution, and a SR transmission delay.

25. The method of claim 23 further comprising:
configuring the second D-SR period through the first connection with a user equipment (UE) and;
informing the UE the second D-SR period through the first connection.

26. The method of claim 24, wherein the assisting information comprises a preferred D-SR period selected from the list of discrete D-SR period candidates.

27. The method of claim 24, wherein the RRC signaling is a list of sr-ConFigIndex.

28. The method of claim 26 further comprises:
calculating a first quantity of D-SR utilization during a first measurement period for adjusting the D-SR period.

29. The method of claim 28 further comprises:
calculating a second quantity of random access (RA) success during the first measurement period for adjusting the D-SR period.

30. The method of claim 28 further comprising:
adjusting the D-SR period by producing an updated D-SR period which is lengthened when the first quantity falls below a first threshold.

31. The method of claim 22 further comprising:
adjusting the D-SR period by producing the updated D-SR period which is shortened when the second quantity exceeds a second threshold.

32. The method of claim 31 further comprising:
configuring the second D-SR period based on the updated D-SR period; and
informing the second D-SR period through the first connection.

33. The method of claim 31 further comprising:
configuring the second D-SR period using the updated D-SR period without informing another control node or a UE.

34. The method of claim 22, wherein the step of establishing the first connection in order to receive uplink data further comprises:
transmitting the D-SR period through a RRC signaling, wherein, the D-SR period is a default D-SR period.

35. The method of claim 22, wherein the first connection is a RRC connection or a radio bearer related connection.

36. The method of claim 22, wherein the assisting information further comprises at least one of a SR transmission delay or an inter-arrival time (IAT) distribution.

37. The method of claim 22, wherein the D-SR period is used for requesting an uplink grant to transmit a buffer status report (BSR).

38. The method of claim 22 further comprising:
receiving a SR which uses the T-SR resource which is known based on a predefined rule when the predefined rule exists to implicitly define the T-SR resource.

39. The method of claim 22 further comprising:
transmitting a response to a user equipment for the request for the T-SR resource when no predefined rule exists to implicitly define the T-SR resource.

40. The method of claim 39 further comprising:
transmitting the predefined rule directly to a user equipment or configuring the user equipment for the T-SR resource based on the assisting information.

41. The method of claim 22 wherein the control node comprises a transmitter and a receiver for respectively transmitting and receiving wireless data, and a processing circuit coupled to the transmitter and the receiver and is configured for executing the steps of claim 1.

42. The control node of claim 22, wherein the control node is one of an enhanced Node B (eNB), a base station (BS), a repeater, a relay station, a Serving Gateway (S-GW), a Gateway General Packet Radio Services (GPRS) Support Node (GGSN), a Serving GPRS Support Node (SGSN), a Radio Network Controller (RNC), or an Access Service Network (ASN-GW).

\* \* \* \* \*